(12) United States Patent
Gupta

(10) Patent No.: US 8,808,428 B2
(45) Date of Patent: Aug. 19, 2014

(54) FUEL VAPOR REMOVAL METHODS AND SYSTEMS FOR FLAMMABILITY REDUCTION

(75) Inventor: Alankar Gupta, Normandy Park, WA (US)

(73) Assignee: The Boeing Company, Chicago, IL (US)

( * ) Notice: Subject to any disclaimer, the term of this patent is extended or adjusted under 35 U.S.C. 154(b) by 193 days.

(21) Appl. No.: 13/431,046

(22) Filed: Mar. 27, 2012

(65) Prior Publication Data

US 2013/0255493 A1 Oct. 3, 2013

(51) Int. Cl.
*B65D 90/22* (2006.01)
*B01D 53/04* (2006.01)

(52) U.S. Cl.
USPC ............ 95/143; 96/112; 244/129.2; 220/88.3

(58) Field of Classification Search
USPC ................. 95/141, 143, 146, 148, 14, 19, 21; 96/112, 113, 115; 244/135 R, 129.2; 220/88.3
See application file for complete search history.

(56) References Cited

U.S. PATENT DOCUMENTS

| | | | | |
|---|---|---|---|---|
| 5,054,453 | A | * | 10/1991 | Onufer ........................... 123/516 |
| 5,755,854 | A | * | 5/1998 | Nanaji ............................... 95/11 |
| 6,343,465 | B1 | | 2/2002 | Martinov |
| 6,478,849 | B1 | * | 11/2002 | Taylor et al. ...................... 95/11 |
| 6,689,196 | B2 | * | 2/2004 | Amano et al. ................... 96/112 |
| 6,843,269 | B2 | * | 1/2005 | Verma et al. ................... 137/209 |
| 7,476,269 | B2 | * | 1/2009 | Begley et al. ..................... 96/147 |
| 7,905,259 | B2 | * | 3/2011 | Johnson et al. .................. 141/64 |
| 7,918,358 | B2 | | 4/2011 | Gupta |
| 7,955,424 | B2 | | 6/2011 | Gupta |
| 8,128,739 | B1 | | 3/2012 | Gupta |
| 8,273,164 | B2 | * | 9/2012 | Makino et al. ................... 96/134 |
| 2004/0163826 | A1 | * | 8/2004 | Spring ............................. 169/46 |
| 2009/0166358 | A1 | * | 7/2009 | Bose ............................ 220/88.3 |

OTHER PUBLICATIONS

Schieferstein, Dr. rer. nat. Eva, "Optimizing Adsorption Processes;" Fraunhofer-Gesellschaft: Fraunhofer Institute for Environmental, Safety and Energy Technology—Projekt Online in the Web; URL: http://www.umsicht.fraunhofer.de/en/business-units/process-technology/projects/optimizing-adsorptionprocesses. 2011.
Young, Jon W.; Tuttle, W.N., Reduction of Hydrocarbon Emissions from Air through Pressure Swing Regeneration of Activated Carbon, AIChE Conference,1997.
Gupta, Alankar, PE; "Method and System for Making a Fuel-tank Inert Without an Inert Gas," SAE International, 2009.

* cited by examiner

*Primary Examiner* — Frank Lawrence
(74) *Attorney, Agent, or Firm* — Parsons Behle & Latimer

(57) ABSTRACT

A fuel vapor removal method includes removing fuel vapor from ullage of a fuel tank of a vehicle, adsorbing the fuel vapor removed from the ullage onto adsorption media on the vehicle, and desorbing the fuel vapor from the adsorption media while on the vehicle. A fuel vapor removal method includes purging fuel vapor from ullage of a fuel tank using air added into the ullage, reducing a fuel-air ratio in the ullage using the air purging, and adsorbing the purged fuel vapor onto adsorption media. A fuel vapor removal system includes a fuel tank having ullage, an adsorption system including fuel vapor adsorption media fluidically connected to the ullage and to an ullage purging system, and a controller. The controller includes a flammability determination system and is configured to start fuel vapor removal by the purging system from the ullage onto the adsorption media before the ullage exhibits flammability.

22 Claims, 6 Drawing Sheets

FUEL VAPOR REMOVAL METHODS AND SYSTEMS FOR FLAMMABILITY REDUCTION

TECHNICAL FIELD

The embodiments pertain to fuel vapor removal methods and systems, such as for an aircraft.

BACKGROUND

In the context of fuel tanks, "inerting" may refer to the process of making ullage in a fuel tank non-flammable. The Federal Aviation Administration (FAA) reconsidered aircraft fuel tank safety after a series of fuel tank explosions between 1990 and 2001. The National Transport Safety Board (NTSB) added "Explosive Mixture in Fuel tanks in Transport Category Aircrafts" as the number one item in its 1997 "Most Wanted" Transportation Safety list.

Some known fuel tanks have a region containing liquid fuel and an ullage region that often contains evaporated fuel (i.e., fuel vapor). With the presence of air, the mixture may exhibit a fuel-air ratio within the ullage and ignition may occur when fuel-air ratio in the ullage lies within a certain range. The lower flammability limit is defined as a threshold below which the fuel-air ratio is too lean to ignite. Similarly, the upper flammability limit is defined as the threshold above which the fuel-air ratio is too rich to ignite. The fuel-air ratios between the lower flammability limit and the upper flammability limit are termed flammable.

At temperatures less than 100° F. at sea level, the ullage fuel-air ratio for Jet A fuel generally lies below the lower flammability limit. However, known conditions exist that may result in exceeding the lower flammability limit. One example includes a rapid reduction in tank ullage pressure after take off, such as when the aircraft reaches a high altitude in a short time before fuel-tank temperature substantially decreases.

FAA regulations require that new and in-service transport aircraft include systems for enhancing the safety of aircraft fuel tanks. One known system uses an inert gas, such as nitrogen, to reduce the oxygen concentration in ullage. Such a system is expensive, complex, and increases weight of the aircraft. Another known system cools ullage mixture to condense out fuel vapors and to maintain the fuel tank ullage at a relatively low fuel-air ratio, significantly lower than the flammability limit. It is possible to improve methods and systems for reducing flammability of fuel tanks.

SUMMARY

In an embodiment, a fuel vapor removal method includes removing fuel vapor from ullage of a fuel tank of a vehicle, adsorbing the fuel vapor removed from the ullage onto adsorption media on the vehicle, and desorbing the fuel vapor from the adsorption media while on the vehicle.

In another embodiment, a fuel vapor removal method includes purging fuel vapor from ullage of a fuel tank using air added into the ullage, reducing a fuel-air ratio in the ullage using the air purging, and adsorbing the purged fuel vapor onto adsorption media.

In a further embodiment, a fuel vapor removal system includes a fuel tank having ullage, an adsorption system including fuel vapor adsorption media fluidically connected to the ullage and to an ullage purging system, and a controller. The controller includes a flammability determination system and is configured to start fuel vapor removal by the purging system from the ullage onto the adsorption media before the ullage exhibits flammability.

BRIEF DESCRIPTION OF THE DRAWINGS

Some embodiments are described below with reference to the following accompanying drawings.

DETAILED DESCRIPTION

Figure 1:
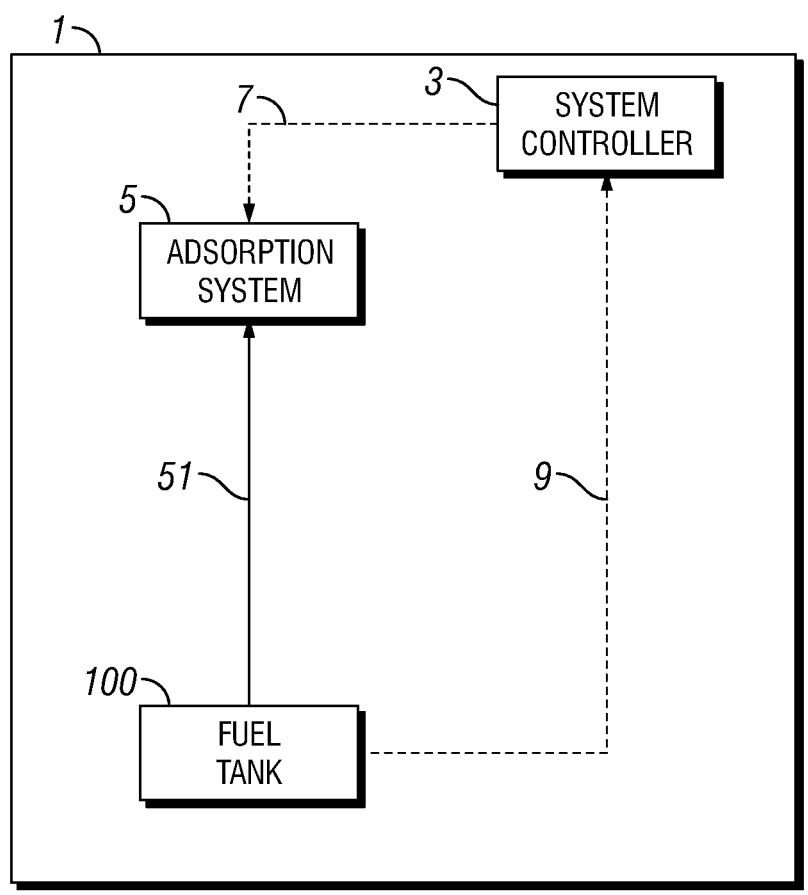
FIGS. 1 and 2 are schematics of fuel vapor removal systems according to two embodiments.

Embodiments described herein may reduce fuel vapor discharge from fuel tanks. Also, the embodiments may make fuel tank ullage non-reactive with ignition sources, i.e., make it inert or, in other words, limit formation of a flame when challenged by an ignition source.

The embodiments may reduce fuel vapor discharge from fuel tanks during fuel tank servicing (filling). Some of the fuel vapors that presently exhaust out of the fuel tank through the fuel tank vent during fuel tank filling may be adsorbed in a fuel vapor adsorption media, or adsorbent, such as activated charcoal.

The embodiments may reduce fuel tank ullage flammability by reducing ullage fuel-air ratio with a preventive system. Flammable fuel tank ullage may be rendered non-reactive with ignition sources (i.e., inert) by reducing ullage fuel-air ratio significantly below the low flammability limit (or combustion threshold.) The system may purge the fuel tank ullage with outside (ambient) air. Purged fuel vapors may be adsorbed by the adsorbent.

The embodiments may desorb (or reactivate) the adsorbent onboard. The released fuel vapors may be:
(a) condensed to liquid fuel and returned to the fuel tank, or
(b) ducted to the propulsive engine for combustion/destruction, or
(c) exhausted overboard.

The embodiments use a process of adsorption, which may include the adherence of a chemical species onto the surface of a substance, such as particles. Adsorption differs from absorption in which a substance merely diffuses into a liquid or solid. A variety of adsorbing materials may be used in the embodiments, such as activated charcoal. Activated charcoal is known for use to adsorb fuel vapors.

The embodiments may withdraw ullage mixture using a suction pump when the fuel tank is being serviced. The withdrawn ullage mixture may be channeled through the adsorbent that adsorbs the fuel vapor and exhausts out air of low fuel vapor content. Presently, the ullage mixture is forced out of the fuel tank through the fuel-tank vent to the ambient as fuel is added to the fuel tank. Fuel vapors are malodorous and some components of the discharge are claimed to be carcinogenic. Fuel vapors are considered to be hazardous to humans and the environment. Automobiles and gas stations have fuel vapor recovery systems for this reason. Aviation uses billions of gallons of fuel annually and billions of cubic feet of ullage mixture is exhausted to the outside ambient during fuel tank servicing.

The embodiments may use ullage purging for removing fuel vapors from the ullage to reduce ullage fuel-air ratio. Proactive purging of the fuel tank may reduce occurrences when the fuel tank becomes flammable. The start of purging process can be selected at desired fuel temperature (or fuel-air ratio, as they are related at ullage saturation).

Fuel tanks tend to become flammable when the fuel temperature ($T_{fuel}$) is equal to or above the low flammability limit temperature $T_{lfl}$. In the embodiments, purging of the ullage may start at fuel temperature (referred to herein in $T_{start}$) lower than the low flammability limit temperature and may be stopped at fuel temperature (referred to herein as $T_{stop}$) below the start temperature, $T_{start}$. This ensures non-flammable ullage mixture that is non-reactive with ignition sources, i.e., inert. In the event the fuel tank temperature is already greater than $T_{lfl}$ (i.e., the fuel tank is flammable), the start of purging removes flammable ullage mixture and dilutes the ullage with ambient air, thus progressively reducing ullage flammability and rendering it inert.

The purging start temperature ($T_{start}$) and stop temperature ($T_{stop}$) may be determined using the fuel tank pressure ($P_{fuel}$) or ambient pressure ($P_{amb}$), if the fuel tank is vented. The method for determining $T_{start}$ and $T_{stop}$ may reside in the system controller. The controller may also contain the logic for starting and shutting off fuel-tank purging functions. Ullage purging may be accomplished using a suction pump that withdraws ullage mixture through the adsorbent and discharges overboard air of low fuel content. Outside air may enter the fuel tank through a fuel tank vent and/or other openings of similar function to occupy the space vacated by the withdrawn ullage mixture.

Reactivation of the adsorbent may occur when the fuel tank is inert. Fuel tanks are generally inert at high altitude when the fuel ($T_{fuel}$) temperatures are significantly lower than the low flammability limit temperatures, $T_{lfl}$. The system logic first confirms that the ullage is inert by comparing the fuel temperature ($T_{fuel}$) with the relevant purging system start temperature ($T_{start}$). On confirmation of inert status, the reactivation system operates if the outside air pressure ($P_{amb}$) is below the selected designed pressure ($P_r$). In the case of a vented fuel tank, $P_{amb}$ is equal to $P_{fuel}$ and it may be used as the determining factor.

During the reactivation process, warm air may be forced through the adsorbent to facilitate release and removal of the adsorbed fuel vapors. Ullage flammability may be periodically or continuously checked during the reactivation process. The reactivation process may be suspended and the purging process activated if $T_{fuel}$ exceeds the relevant $T_{start}$ (i.e., conditions conducive to making the ullage non-inert are encountered). The reactivation process may automatically restart when conditions for the reactivation process exist. The reactivation process may operate continuously till $P_{amb}$ or $P_{fuel}$ becomes greater than $P_r$. Desorption at high altitude (or low pressure) may use the "pressure swing desorption" principle. In pressure swing desorption, reducing the absolute pressure of the adsorbent facilitates desorption and restoration of an adsorbent's working capacity. Desorbed fuel may be swept from the adsorbent by the warm reactivation air.

Fuel vapor rich air from a desorption system may be additionally conveyed by ducting to:
(a) a propulsive engine(s) for combustion/destruction, or
(b) a heat-exchanger for cooling (perhaps using outside air), separating condensed fuel vapors in a fuel mist separator, returning condensed fuel to the fuel tank, and exhausting air of low hydrocarbon content over board, or
(c) a discharge port for exhaust overboard during flight.

Benefits of the embodiments may include reducing discharge of fuel vapors to outside ambient during fuel tank servicing. Presently, no regulations forbid the exhaust of fuel vapors during servicing of the airplane fuel tanks. However, such regulations exist for automobiles and service stations. To the extent that it becomes advisable to reduce fuel vapor release, options (a) and (b) in the preceding paragraph may provide a cost effective method for doing so. Also, option (c) reduces localized release by dispersing fuel vapors over a wide area at high altitude.

Another benefit includes a method to inert a fuel tank without the use of an inert gas. Purging of the fuel tank is an effective method based on the fact that lean fuel-air mixtures do not ignite. The threshold fuel-air ratio for combustion of Jet A fuel is approximately 0.03 for altitudes from sea-level to 45,000 feet. This fuel-air ratio may occur in fuel vapor saturated ullage at temperatures of approximately 105° F. at sea level, reducing linearly to approximately 60° F. at 35,000 feet altitude. In the embodiments, one may select fuel temperature corresponding to saturated fuel-air ratio of approximately 0.02 to start ullage purge and provide a high safety factor. Another basis for selecting fuel temperature may be used instead. A saturated fuel-air ratio of 0.02 corresponds to $T_{start}$ of approximately 85° F. at sea-level and 45° F. at 35,000 feet. The systems and methods herein may maintain the fuel-tank ullage fuel-air ratio significantly below 0.02 even when the fuel temperatures are higher or the fuel tank is heated and prevent the fuel tank from becoming flammable. In the event the fuel tank is flammable at the start of the purging process, the system may reduce ullage flammability and render it inert.

A further benefit includes inerting a fuel tank with or without engines operating. Known nitrogen gas systems (NGS) for inerting cannot be used until high-pressure air is available. This may require operating engines to service the on-board inert gas generating system (OBIGGS). The embodiments use a small fraction of the power required by NGS. The embodiments do not generate nitrogen-enriched air (NEA), which presents an asphyxiation hazard. Also, the embodiments do not generate oxygen-enriched air (OEA), which presents a fire hazard. In addition, the embodiments do not discharge one cubic feet of hydrocarbon laden ullage mixture for each cubic feet of NEA supplied to the fuel tank. Instead, the embodiments provide extremely safe methods and systems to inert a fuel tank.

A still further benefit includes inerting a fuel tank without expensive components, such as those used by NGS, e.g., air separation module (ASM) including hollow fiber membrane (HFM), high efficiency air filter, ozone converter, turbo-compressor, oxygen sensor, etc. The embodiments might be configured with only one moving part, a blower; a simple component of high reliability that can be easily replaced, in situ, thus enhancing system availability. The complexity of maintaining NGS requires 10-20 day relief from Minimum Equipment List (MEL) requirements, or the minimum components that must be functioning for aircraft to be permitted to operate. A 10-20 day relief means aircraft can operate for 10-20 days with a failed NGS. This defeats the purpose for NGS.

Yet other benefits include reduced need for spare parts, reduced maintenance cost, low recurring and non-recurring costs, and a method that truly inerts a fuel tank. NGS designed to FAA requirements does not inert a fuel tank under all foreseeable conditions. NGS design requirements (Appendix N of 14 Code of Federal Regulations, part 25) are not based on preventing the formation of a flame when ullage is exposed to an ignition source. Instead, the design requirements are based on the development of an internal pressure (or force) necessary to rupture a foil diaphragm of 100 square inches installed on a 9.0 cubic feet test fuel tank that bears no similarity to a typical aircraft fuel tank. While it might inert a fuel tank under some circumstances, such design specification for NGS design does not ensure an inert (non-flammable) ullage during all foreseeable operating conditions.

Another known system described in U.S. Pat. No. 6,343,465 issued to Martinov involves ducting fuel fume-vapors from ullage to aircraft engines. In comparison, some embodiments herein do not require an operating engine or Auxiliary Power Unit (APU) for operation. Performance (ullage mixture removal rate) may be independent of the engine power. The embodiments may be used to reduce ullage flammability or render the ullage inert before engine start using ground electrical power.

In an embodiment, a fuel vapor removal method includes removing fuel vapor from ullage of a fuel tank of a vehicle, adsorbing the fuel vapor removed from the ullage onto adsorption media on the vehicle, and desorbing the fuel vapor from the adsorption media while on the vehicle.

By way of example, the method may further include determining that the ullage is approaching flammability before the removing of the fuel vapor from the ullage. The vehicle may include an aircraft and the desorbing of the fuel vapor may occur while the aircraft is in flight. The method may further include exhausting the desorbed fuel vapor overboard while the aircraft is in flight or burning the desorbed fuel vapor in a propulsive engine of the aircraft. Instead, the method may further include condensing the desorbed fuel vapor and returning the condensed fuel to the fuel tank.

The removing of the fuel vapor may include purging the ullage with air added into the ullage and the method may further include reducing a fuel-air ratio in the ullage using the air purging. The reduced fuel-air ratio may be below a flammability limit. The added air may be from outside the aircraft or from an onboard source. The added air may be conditioned.

The desorbing of the fuel vapor may occur while a fuel-air ratio in the ullage is below a flammability limit. The adsorption media may contain activated carbon and the desorbing of fuel vapor may include reactivating the activated carbon. The adsorption media may contain a substance other than activated carbon. Accordingly, the adsorption media may be characterized as exhibiting adsorption properties suitable for the purposes described herein. While many materials may potentially adsorb fuel vapor, those with sufficiently high surface area would be beneficial. Often, the media intended for known fuel vapor adsorption applications is evaluated for such purposes by its adsorptive capacity. Such media may be suitable for the embodiments herein. The adsorption media may exhibit a first temperature at a conclusion of the adsorbing before the desorbing begins. The desorbing of the fuel vapor may include flowing air through the media, the flowed air exhibiting a second temperature higher than the first temperature and the media being at a pressure below 14.7 pounds per square inch (psi).

In another embodiment, a fuel vapor removal method includes purging fuel vapor from ullage of a fuel tank using air added into the ullage, reducing a fuel-air ratio in the ullage using the air purging, and adsorbing the purged fuel vapor onto adsorption media.

By way of example, the fuel tank and adsorption media may be on an aircraft. The reduced fuel-air ratio may be below a flammability limit. The method may further include desorbing the fuel vapor from the adsorption media while the fuel-air ratio is below a flammability limit. The adsorption media may exhibit a first temperature at a conclusion of the adsorbing before the desorbing begins. The desorbing of the fuel vapor may include flowing air through the media, the flowed air exhibiting a second temperature higher than the first temperature and the media being at a pressure below 14.7 psi. The fuel tank and adsorption media may be on an aircraft. Also, the desorbing of the fuel vapor may occur while the aircraft is in flight. Further, the flowed air may contain ambient air and/or spent ram air, either of which may likely be below 14.7 psi while an aircraft is in flight. However, the flowed air as supplied may exhibit a pressure at or above 14.7 psi, but still allow a media pressure below 14.7 psi when the flowed air expands into the adsorber (e.g., adsorber 53) with a resulting pressure drop.

In a further embodiment, a fuel vapor removal system includes a fuel tank having ullage, an adsorption system including fuel vapor adsorption media fluidically connected to the ullage and to an ullage purging system, and a controller. The controller includes a flammability determination system and is configured to start fuel vapor removal by the purging system from the ullage onto the adsorption media before the ullage exhibits flammability.

By way of example, the system may further include a vehicle, wherein the fuel tank is a fuel tank of the vehicle and the adsorption system is on the vehicle. The vehicle may include an aircraft. The adsorption system may be an adsorption and desorption system. Thus, it may further include a fuel vapor desorption system, the controller being further configured to stop fuel vapor removal by the purging system and to start fuel vapor desorption by the desorption system while the ullage is nonflammable. The desorption system may include an air blower and an air heater fluidically connected to the adsorption media.

Also, the purging system may include an air inlet on the fuel tank and a suction pump fluidically connected to the adsorption media. The flammability determination system may include a fuel temperature sensor, a fuel tank pressure sensor, and a processor configured to determine flammability using at least a fuel temperature and a fuel tank pressure. The adsorption media may include activated carbon.

As a more specific example, system 1 in FIG. 1 includes a fuel tank 100 having ullage. An adsorption system 5 includes fuel vapor adsorption media (not shown) fluidically connected by a conduit 51 to the ullage of fuel tank 100. Adsorption system 5 also includes adsorbed fuel vapor purging system (not shown) fluidically connected thereto. System 1 includes a controller 3 having a flammability determination system. Controller 3 receives a signal 9 indicating a condition of fuel tank 100 and starts fuel tank ullage purging before the ullage of fuel tank 100 exhibits flammability. Purging is started by controller 3 sending a signal 7 to adsorption system 5, which purges the ullage onto the adsorption media.

Figure 2:
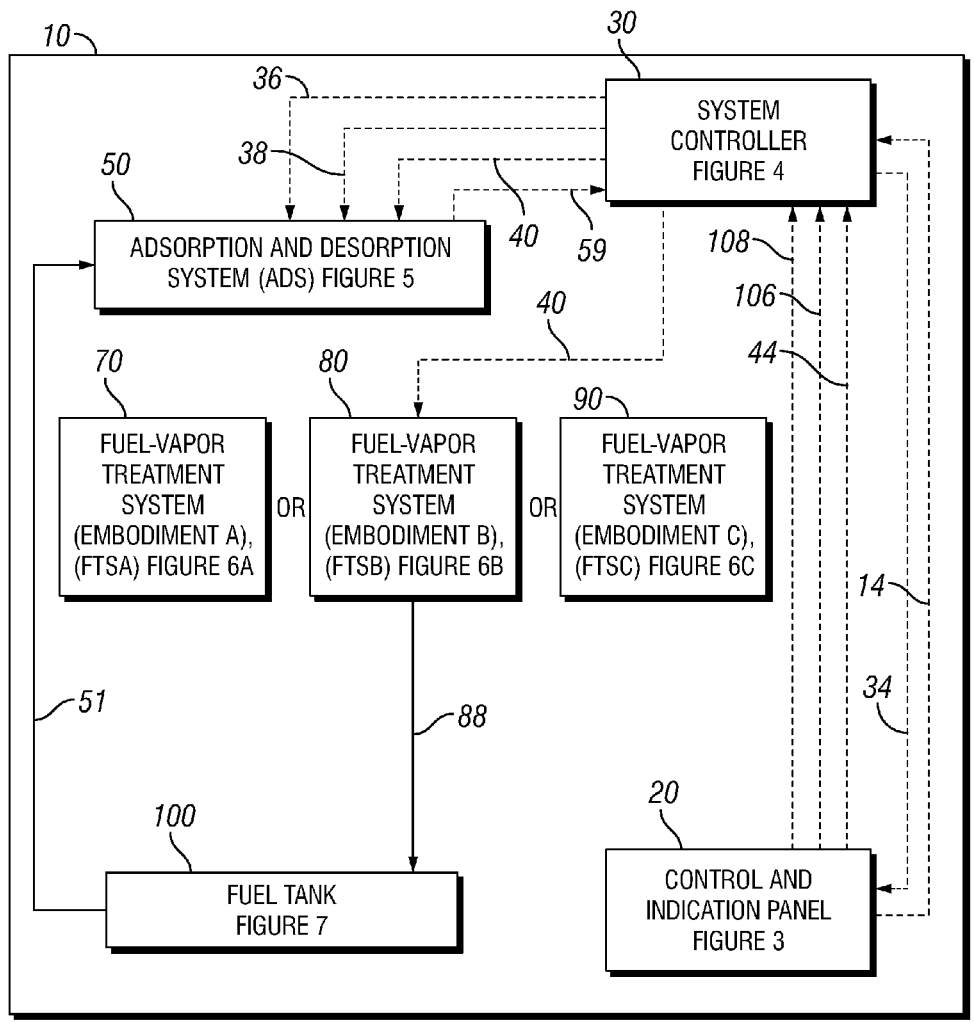
Figure 5:
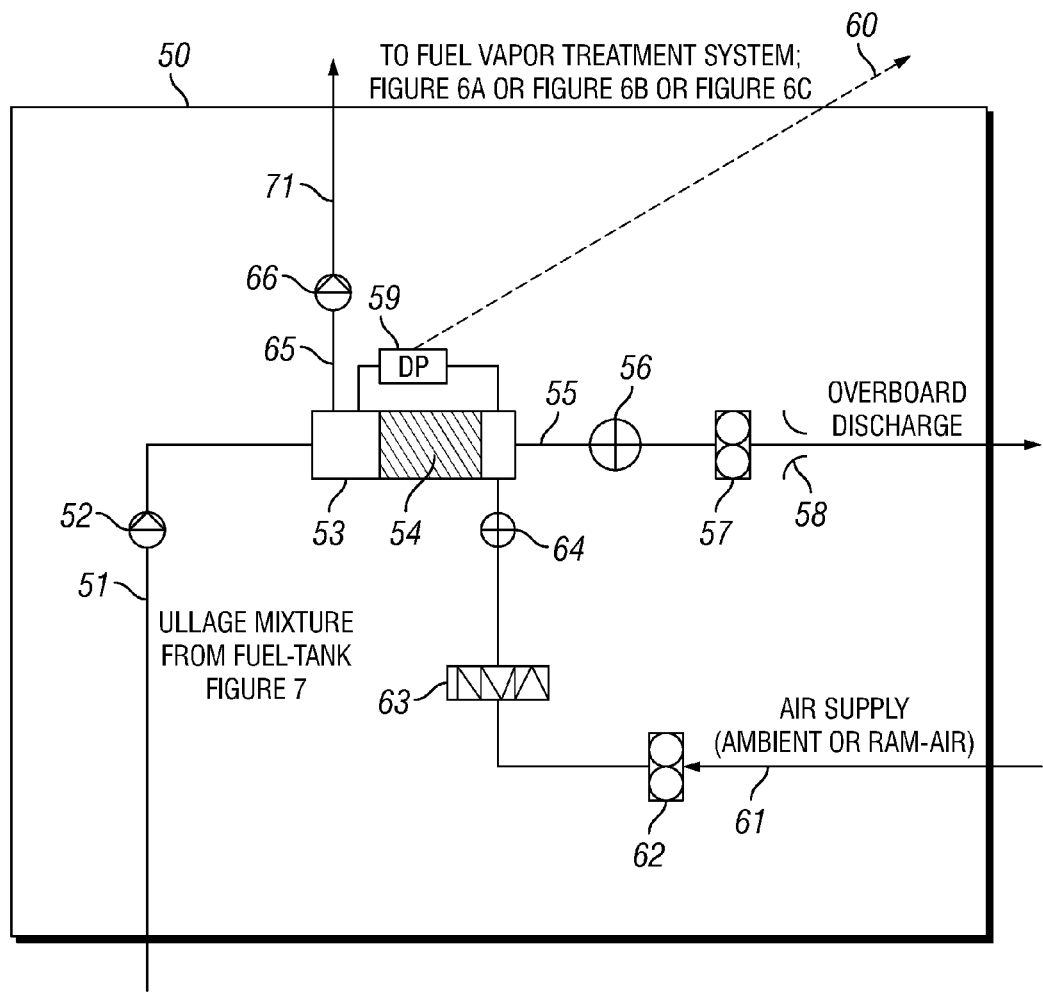
Figure 6A:
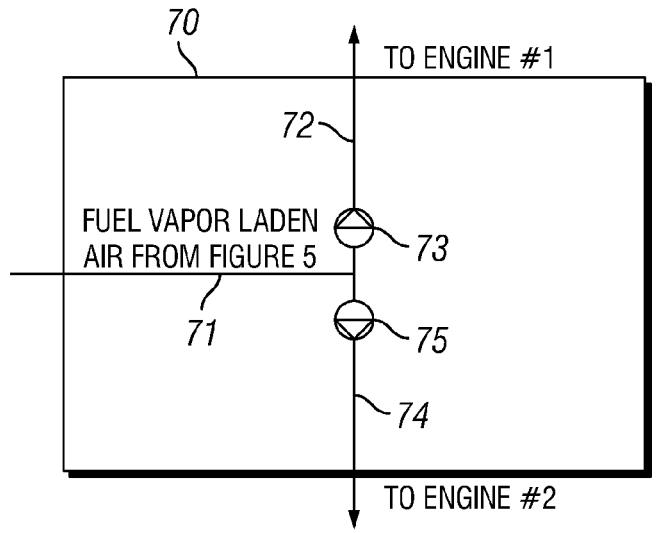
Figure 6B:
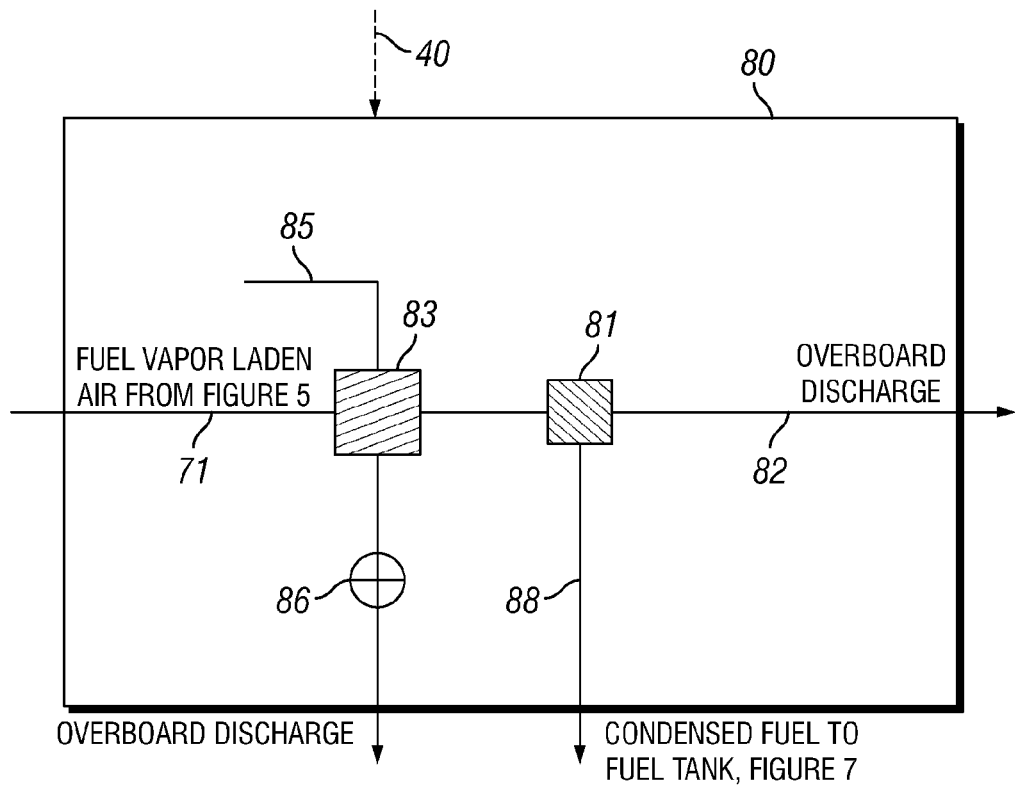
Figure 6C:
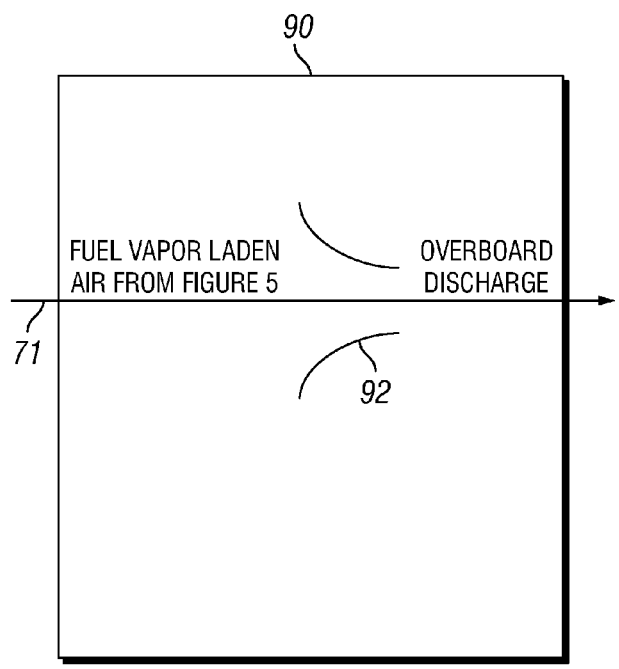

As a further example, system 10 in FIG. 2 may be on an aircraft, such as an airplane, and include: a control and indication panel 20 (detailed in FIG. 3), a system controller 30 (detailed in FIG. 4), an adsorption and desorption system 50 (detailed in FIG. 5), herein referred to as (ADS), a fuel-vapor treatment system herein referred as (FTS), and a fuel tank 100 (detailed in FIG. 6). Three embodiments of FTS are described: Embodiment A, 70, FIG. 6A (hereinafter FTSA); Embodiment B, 80, FIG. 6B (hereinafter FTSB); and Embodiment C, 90, FIG. 6C (hereinafter FTSC). Embodiment C is included with the other FTS embodiments for simplicity. However, technically, Embodiment C does not incorporate "treatment," since the fuel vapor laden exhaust from the adsorber is vented overboard during the desorption process in Embodiment C.

Figure 3:
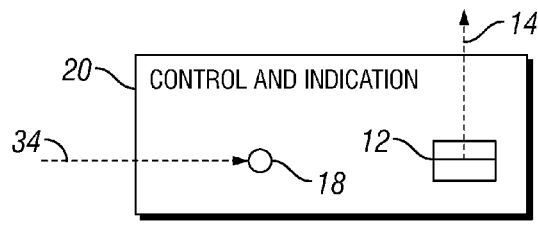
FIGS. 3-7 are schematics of some components of the FIG. 2 system shown in further detail.

FIG. 3 shows control and indication panel 20 in more detail. The panel includes a manual switch 12 for system selection. Switch 12 in the ON position provides signal 14 to system controller 30 (FIG. 4) to manage operation of ADS 50 (FIG. 5) and FTS (FIG. 6A or 6B or 6C). The operation of system 10 may be fully automatic and need not require crew action.

Panel 20 receives signal 34 from controller 30 when ADS is not operating per design. Signal 34 may be used to advise, caution, or warn. It may be used to illuminate blower indicator 18.

Panel 20 may include more or fewer indicators, e.g., fuel temperature may be added and/or blower indicator 18 may be removed. Also, panel 20 may be deleted by hardwiring system 10 such that it is powered when electrical power is available on the aircraft. Panel 20, if used, may be located in the cockpit or any other appropriate location.

Figure 4:
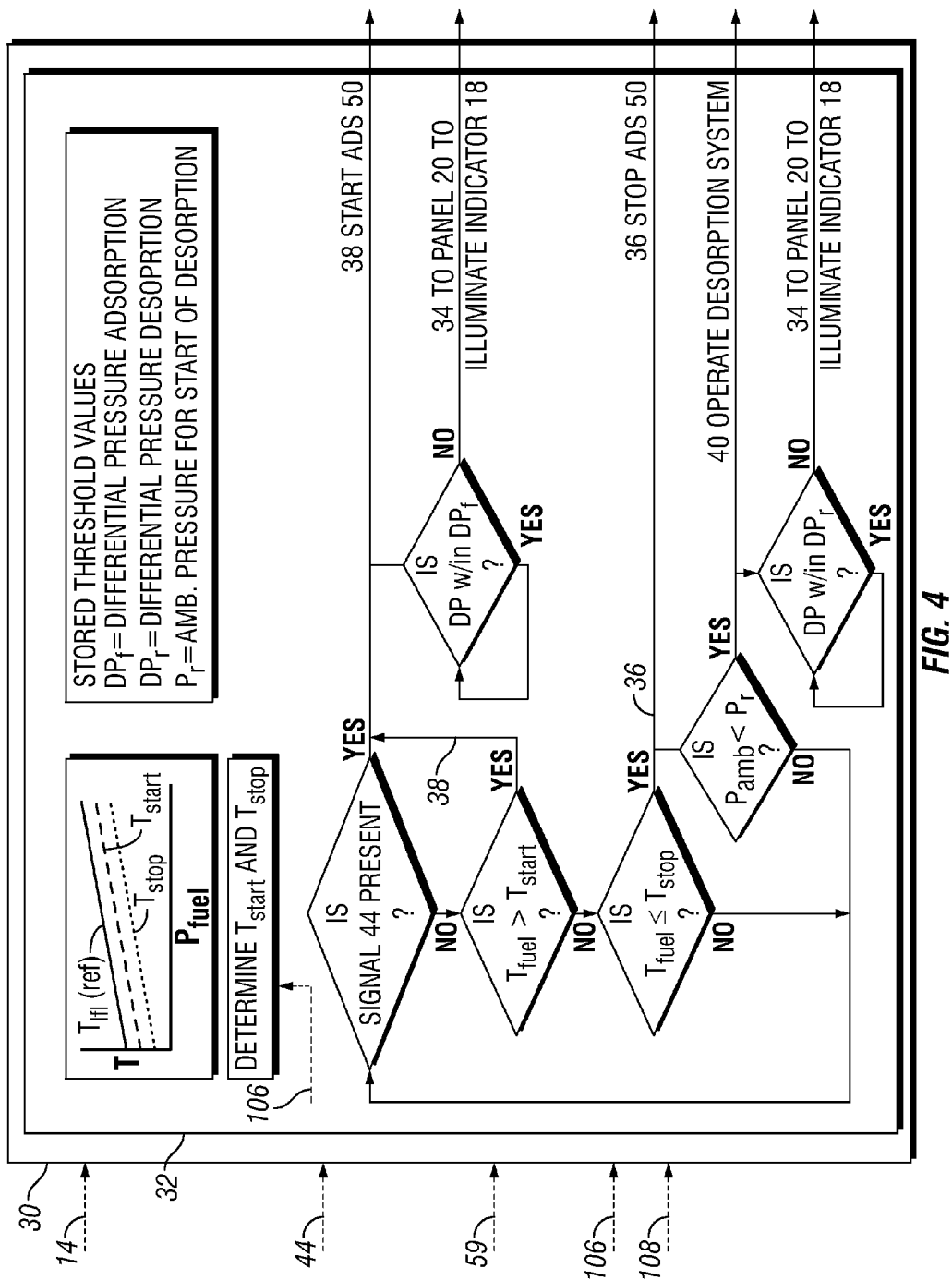

System controller 30 is shown in FIG. 4 and includes a processor 32 that receives a signal 106 from a fuel pressure sensor P transmitting $P_{fuel}$ fuel and a signal 108 from a fuel temperature sensor T transmitting $T_{fuel}$. Controller 30 also receives a signal 44 when the fueling hose is connected to the fueling port. Other signals received and transmitted by the controller are discussed below.

Microprocessor 32 performs a number of functions on receipt of signal 14 from panel 20. Microprocessor 32 generates $T_{start}$ and $T_{stop}$ temperatures for ADS 50. It uses fuel tank pressure $P_{fuel}$ signal 106 from fuel tank pressure sensor P in FIG. 7 to generate $T_{start}$ and $T_{stop}$ temperatures by one of the following two methods: (a) table look-up using $P_{fuel}$ to t determine $T_{start}$ and $T_{stop}$ from data stored in the memory of microprocessor 32 or (b) using known algorithms programmed in the microprocessor. The table-look up method may be of greater benefit. The data stored in microprocessor 32 may be of the type shown graphically in FIG. 4.

Lower flammability limit (LFL) temperatures, $T_{lfl}$, are shown in FIG. 4 as one example only. At fuel temperatures equal to the low flammability limit, the ullage may become flammable (non-inert) if the ullage is allowed to saturate with fuel vapors. In a fuel tank, when the fuel temperature is greater than $T_{lfl}$, the ullage fuel-air ratio can become greater than the combustion threshold. For Jet A fuel, the combustion threshold fuel-air ratio is approximately 0.03 from sea-level to approximately 45,000 feet. Low flammability limit temperatures are not necessarily stored in the memory of microprocessor 32. Low flammability limit temperatures are shown in FIG. 4 merely to indicate graphically that $T_{start}$ temperatures are lower than $T_{lfl}$ during all operating conditions. This ensures start of fuel-tank ullage purging at fuel-air ratios lower than the combustion threshold. The difference between $T_{lfl}$ and $T_{start}$ is a safety factor and may be selected by the system designer.

Figure 7:
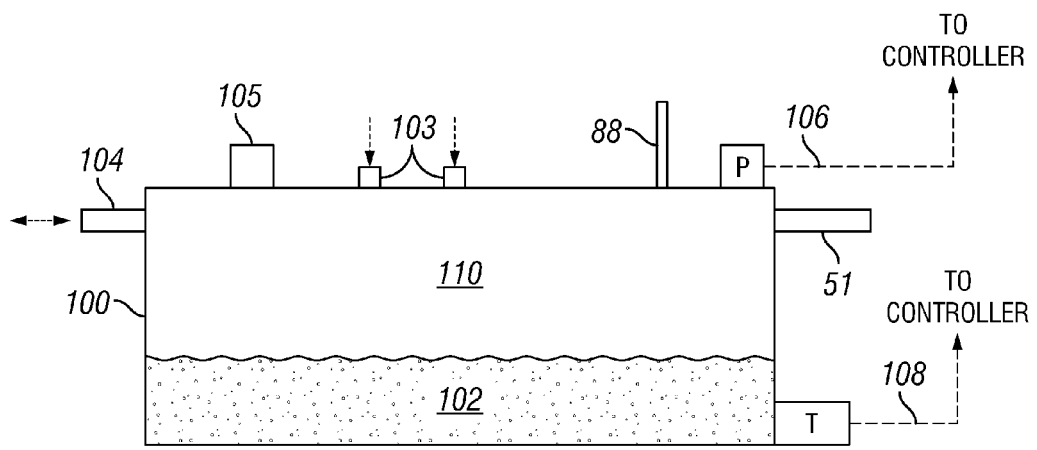

Microprocessor 32 generates signal 38 when signal 44 is present. Signal 44 indicates that the fuel servicing hose is connected to the fuel servicing port 105 (FIG. 7). Any known method to sense connection of the servicing hose to fuel servicing port 105 may be used, including a manual on/off switch. Presence of signal 44 may be used to indicate fuel vapors will discharge out of fuel tank 100 as fuel is pumped into tank 100 (FIG. 7). Signal 38 causes adsorption process to start in ADS 50. Signal 38 causes a shut-off valve 56 to open and a blower 57 to operate (FIG. 5). This causes an ullage mixture in ullage 110 to flow via a conduit 51, a check valve 52, an adsorber 53, and a shut-off valve 56 to the blower 57 (FIG. 5). Fuel vapors present in withdrawn ullage mixture are adsorbed by adsorbing media 54 and air with extremely low fuel vapor content then exhausts out to the ambient via a discharge 58. Air enters fuel tank 100 (to replace withdrawn ullage mixture volume that is not filled by the fuel entering fuel tank 100) through an ambient vent 104 and air inlet ports 103 (FIG. 7). Air inlet ports 103 may incorporate check valves to reduce ullage mixture discharge through them during aircraft climb. Also, air inlet ports 103 may be removed, for example, if ambient vent 104 is adequate alone. On removal of signal 44, signal 38 ceases. This causes valve 56 to close and blower 57 to stop operating.

Microprocessor 32 continuously performs comparative analysis of $T_{fuel}$ and $T_{start}$ temperatures and generates signal 38 when $T_{fuel}$ is greater than $T_{start}$. Signal 38 starts ADS 50 operation.

Microprocessor 32 checks for ullage mixture flow through adsorber 53 when signal 38 is present, either due to the presence of signal 44 (see above) or due to $T_{fuel}>T_{start}$ (see above). Flow verification confirms desired performance of blower 57 and adsorber 53. The verification may be performed using a differential pressure transducer 59 (FIG. 5) that transmits a signal 60 to controller 30. A differential pressure signal 60 within a design threshold $DP_f$ signifies proper blower/adsorber performance. When signal 60 is outside the selected threshold, $DP_f$, it generates signal 34 transmitted to control and indication panel 20, FIG. 3, to illuminate blower indicator 18. $DP_f$ is stored in the memory of microprocessor 32.

Microprocessor 32 compares $T_{fuel}$ and $T_{stop}$ temperatures and generates signal 36 when $T_{fuel}$ is equal to or less than $T_{stop}$. Such condition signifies that the fuel tank temperature (and thus ullage fuel-air ratio) is less than a desired value and further purging of the fuel-tank ullage is not necessary. If the adsorption process was previously operating, then signal 36 deactivates the process by closing shut-off valve 56 and deactivating blower 57 so that no ullage mixture flows through ADS 50.

Microprocessor 32 generates signal 40 and transmits it to ADS 50 to start the desorption process when desorption system start parameters are satisfied. Desorption system starts operating when fuel tank 100 is inert (i.e. $T_{fuel} \le T_{start}$) and the outside air pressure ($P_{amb}$) is equal to or less than a selected threshold pressure $P_r$ ($P_{amb} \le P_r$). In the case of a vented fuel tank, fuel-tank pressure, $P_{fuel}$, is equal to the ambient pressure $P_{amb}$ and it may be used instead of $P_{amb}$. Threshold pressure $P_r$ is stored in the memory of microprocessor 32. Desorption starts below threshold pressure Pr since adsorbent readily desorbs at low pressures.

Signal 40 opens a shut-off valve 64, powers a heater 63, and powers a fan of a blower 62 of ADS 50 shown in FIG. 5. Heater 63 may be electric or pneumatic (hot-air supply controlled by a valve, not shown). Blower 62 obtains air via a conduit 61. The air may be ambient air or spent air from another system, e.g., ram-air from downstream of the air-conditioning system heat exchangers (not shown). It may be beneficial for the air to be spent ram air since it is often at higher temperature than the outside ambient air. Warm air flowing through adsorber 53 desorbs fuel vapors from adsorber media 54 and fuel vapor rich air exhausts out of adsorber 53 in a conduit 65. Air in conduit 65 passes through a check valve 66 into conduit 71 that delivers the air to one of three Fuel-vapor Treatment Systems (Embodiment A, 70, FIG. 6A (FTSA); Embodiment B, 80, FIG. 6B (FTSB); and Embodiment C, 90, FIG. 6C (FTSC)). FIG. 5 shows a heater 63 to heat the air delivered by blower 62. Heater 63 may be removed if the air delivered by conduit 61 is of sufficient temperature for desorption of adsorber media 54.

As an alternative, heater 63 and blower 62 may be removed. Compressed and high temperature air from another system may be supplied via conduit 61, e.g., engine bleed-air system (all airplanes except BOEING 787) or from the compressor of the cabin conditioning system (e.g., BOEING 787). Air thus automatically flows to adsorber media 54 when signal 40 opens shut-off valve 64.

Microprocessor 32 checks for air flow through adsorber 53 when signal 40 is present. Flow verification confirms desired performance of the blower 62 and adsorber 53. Verification may be performed using differential pressure transducer 59 (FIG. 5), which transmits signal 60 to controller 30. Signal 60 being within the design threshold $DP_r$ indicates acceptable blower/adsorber performance. When signal 60 is outside the selected threshold, $DP_r$, it generates signal 34 that is transmitted to control and indication panel 20, FIG. 3, to illuminate blower indicator 18. $DP_r$ is stored in the memory of microprocessor 32. Pressure transducer 59 and blower indicator 18 may be removed and other verification means utilized.

Microprocessor 32 automatically deactivates the desorption process when the outside pressure $P_{amb}$ increases above the threshold pressure $P_r$, or fuel temperature $T_{fuel}$ increases above $T_{start}$.

Controller 30 controls the operation of adsorption and desorption system (ADS) 50 by signals 36, 38, and 40, as described above in the discussion referring to such signals.

Fuel vapor laden air discharging from adsorber 53 flows through conduit 71 to fuel vapor treatment system FTS, such as FTSA, FTSB, or FTSC. In FTSA (FIG. 6A), conduit 71 delivers the fuel vapor laden air to (i) engine #1 via check valve 73 and conduit 72, and (ii) to engine #2 via check valve 75 and conduit 74. The fuel vapor laden air may be combusted or destroyed in engines #1 and #2 by any known method. FIG. 6A shows delivery of fuel vapor laden air to engines #1 and #2, but the air may alternatively be ducted to only one engine.

In FTSB (FIG. 6B), fuel vapor laden air discharging from adsorber 53 is delivered to a heat exchanger 83 by conduit 71. Fuel vapor laden air is cooled in the heat exchanger by ambient air delivered to the heat exchanger by a conduit 85. In FTSB, signal 40 transmitted by the controller 30 also opens the normally closed valve 86. This allows ambient air to flow through heat exchanger 83. Some of the fuel vapors condense in heat exchanger 83 and are removed by a fuel vapor separator 81. The separated (or reclaimed) fuel is returned back to fuel tank 100 via a conduit 88. Conduit 82 discharges low fuel vapor content air to outside ambient air.

In FTSC (FIG. 6C), fuel vapor laden air discharging from adsorber 53 is delivered to an exhaust nozzle 92 by conduit 71. In FTSC, the vapors are exhausted overboard. Existing regulations do not forbid the discharge of fuel vapors from fuel tanks to outside ambient air. FTSC bears the advantage of allowing selective discharge of fuel vapors at a time when ground level impact may be reduced, such as when an aircraft is at altitude.

FIG. 7 shows fuel tank 100. It contains fuel liquid fuel 102 and ullage 110. Both air and fuel vapor may be in ullage 110 and such a mixture is often referred to as ullage mixture. Fuel tank 100 is vented to the outside ambient air via a vent 104, which allows outside air to flow in and out to equalize the fuel tank pressure with ambient pressure. Air inlets 103 with check valves (not shown) may be included to allow ambient air to flow into the fuel tank. These inlets supplement air inflow when the blower 57 is operating. Fuel tank servicing port 105 allows connection of refueling hose (not shown) to servicing port 105, which causes (automatic or manual) generation of signal 44 that is transmitted to system controller 30. Fuel tank pressure sensor P provides P fuel signal 106 to system controller 30. Alternatively, pressure sensor P may be removed and an ambient pressure signal ($P_{amb}$) may be provided from the air data system. Fuel temperature sensor T provides $T_{fuel}$ signal 108 to system controller 30. An ullage mixture from ullage 110 flows out of fuel tank 100 to ADS 50 via conduit 51. Liquid fuel flows back to fuel tank 100 via conduit 88 from FTSB (FIG. 6B). Conduit 88 is not needed if FTSA or FTSC are used.

It is apparent from the above that system 10 may reduce ullage fuel-air ratio in fuel tank 100. System 10 starts purging the ullage mixture at temperatures lower than $T_{lft}$, thereby not allowing fuel tank 100 to become flammable. It is thus a preventive system. Also, it is apparent that system 10 may reduce ullage fuel-air ratio and render fuel tank 100 inert in the event fuel tank 100 was initially flammable (non-inert).

Several changes/enhancements in harmony with the embodiments herein can be made to the system described above. For example, grounding straps may be added to reduce the potential of fire due to static electricity. Flame arrestors may be installed to arrest flame propagation in the event of a fire. Built in test equipment may be added to detect failure of components.

System 10 installed in aircraft may operate as follows when electric power (ship's or ground) is available and activated, for example, by placing manual switch 12 in the ON position. Some differences may exist for operation in other vehicles, but those of ordinary skill will readily appreciate appropriate adaptation relying on the description herein.

While on the ground during fuel servicing at all ambient temperatures, system 10 detects fuel-servicing operations by the presence of signal 44. Signal 44 may be auto generated when the fueling hose is connected to the fueling port or it may be a manual signal. System blower 57 withdraws the ullage mixture from ullage 110 through adsorber 53 during the fuel servicing operation. Adsorber media 54 retains the fuel vapors. Ambient air enters fuel tank 100 through fuel tank vent 104 and, if provided, inlet ports 103. System 10 thus reduces airport pollution.

While on the ground at other times (not fueling), including taxi-out for takeoff and during takeoff climb, system 10 remains at standby and automatically starts operating if the fuel temperature exceeds $T_{start}$ due to fuel tank heating. Blower 57 withdraws the ullage mixture from ullage 110 through adsorber 53. Adsorber media 54 retains the fuel vapors. Ambient air enters fuel tank 100 through fuel tank vent 104 and, if provided, inlet ports 103. System 10 continues to operate for fuel temperature $T_{fuel}$ greater than $T_{stop}$. When the fuel temperature reduces below $T_{stop}$, system 10 automatically shuts down. The fuel temperature may reduce to $T_{stop}$ due to fuel tank cooling during takeoff climb.

During cruise, system 10 operates as indicated for on ground (not fueling), taxi-out, and takeoff climb. Additionally, for fuel temperature less than $T_{start}$ AND $P_{amb}$ (or $P_{fuel}$) 1 less than $P_r$, system blower 62 forces warm air through adsorber 53. Fuel vapors retained by adsorber media 54 are released to the warm air. In an alternate embodiment (without blower 62 and heater 63) warm air flows from another system (engine bleed-air or compressed air supply) through adsorber 53. Fuel vapors retained by adsorber 53 are released to the air flow. Fuel vapor laden air is supplied to the fuel vapor treatment system FTSA 70, FTSA 80, or FTSC 90. As such, adsorber media 54 is reactivated for reuse. During descent and taxi-in, system 10 operates as indicated for on ground (not fueling), taxi-out, and takeoff climb.

System 10 may use electrical power for operation of blower 57 during the adsorption process or blower 62 and heater 63 during the desorption process. Power requirements during desorption may be higher when heater 63 is electric. Nevertheless, power requirements may be significantly lower than that of a nitrogen gas inerting system (NGS) that uses an on-board inert gas generating system.

Note the adsorption system operates when the fuel temperature $T_{fuel}$ is greater than $T_{stop}$. Since the outside cold air cools the fuel tank, it is estimated that the adsorption system would operate below about 25,000 feet in a hot atmosphere.

The operation may be up to lower altitudes in cooler atmospheres. The desorption process operates when the ambient pressure $P_{amb}$ (or $P_{fuel}$) is less than threshold pressure $P_r$.

A system, such as system 10, may use highly reliable components, i.e., blowers, valves, heat exchangers, fuel mist separators, sensors, and adsorbers. The blowers may be the only components with moving parts. The system may have a low failure rate and low maintenance requirements compared to NGS. Also, the system may have high reliability and availability compared to NGS. It may be possible to remove and replace failed components on line without the need of 10 days relief in MMEL currently permitted for NGS.

Recurring and non-recurring costs may be extremely low compared to NGS. All components may be state-of the art and readily available at reasonable cost. Recurring costs may be low, since the system might not require scheduled replacement of components (e.g., filters, ozone converter, ASM) like NGS.

The system may be substantially safer than NGS. NGS is designed based on an average bulk oxygen concentration of 12% oxygen in the ullage, which might not render a fuel tank non-flammable (inert) or prevent combustion and generation of fuel-tank internal pressure. The systems and methods herein instead render and maintain the fuel tank non-flammable (inert) and prevent combustion (formation of flame).

In compliance with the statute, the embodiments have been described in language more or less specific as to structural and methodical features. It is to be understood, however, that the embodiments are not limited to the specific features shown and described. The embodiments are, therefore, claimed in any of their forms or modifications within the proper scope of the appended claims appropriately interpreted in accordance with the doctrine of equivalents.

TABLE OF REFERENCE NUMERALS FOR FIGS.

| | |
|---|---|
| 1 | system |
| 3 | system controller |
| 5 | adsorption system |
| 7 | signal |
| 9 | signal |
| 10 | system |
| 12 | manual switch |
| 14 | signal |
| 18 | blower indicator |
| 20 | control and indication panel |
| 30 | system controller |
| 32 | microprocessor |
| 34 | signal |
| 36 | signal |
| 38 | signal |
| 40 | signal |
| 44 | signal |
| 50 | adsorption and desorption system (ADS) |
| 51 | conduit |
| 52 | check valve |
| 53 | adsorber |
| 54 | adsorbing media |
| 56 | shut-off valve |
| 57 | blower |
| 58 | discharge |
| 59 | pressure transducer |
| 60 | signal |
| 61 | conduit |
| 62 | blower |
| 63 | heater |
| 64 | shut-off valve |
| 65 | conduit |
| 66 | check valve |
| 70 | fuel treatment system (FTS) Embodiment A |

-continued

TABLE OF REFERENCE NUMERALS FOR FIGS.

| | |
|---|---|
| 71 | conduit |
| 72 | conduit |
| 73 | check valve |
| 74 | conduit |
| 75 | check valve |
| 80 | FTS Embodiment B |
| 81 | vapor separator |
| 82 | conduit |
| 83 | heat exchanger |
| 85 | conduit |
| 86 | valve |
| 88 | conduit |
| 90 | FTS Embodiment C |
| 92 | exhaust nozzle |
| 100 | fuel tank |
| 102 | fuel |
| 103 | inlet ports |
| 104 | ambient vent |
| 105 | fuel servicing port |
| 106 | signal |
| 108 | signal |
| 110 | ullage |

The invention claimed is:

1. A fuel vapor removal method comprising:
using a controller and an included processor to determine that ullage as a region inside a fuel tank of a vehicle is approaching flammability and, as a result, to start removing fuel vapor from the ullage;
adsorbing the fuel vapor removed from the ullage onto adsorption media on the vehicle; and
desorbing the fuel vapor from the adsorption media while on the vehicle.

2. The method of claim 1 further comprising determining that the ullage is flammable and, as a result, removing the fuel vapor from the ullage.

3. The method of claim 1 wherein the vehicle comprises an aircraft and the desorbing of the fuel vapor occurs while the aircraft is in flight.

4. The method of claim 3 further comprising exhausting the desorbed fuel vapor overboard while the aircraft is in flight or burning the desorbed fuel vapor in a propulsive engine of the aircraft without returning the desorbed fuel vapor to the fuel tank.

5. A fuel vapor removal method comprising:
removing fuel vapor from ullage of a fuel tank of a vehicle;
adsorbing the fuel vapor removed from the ullage onto adsorption media on the vehicle;
desorbing the fuel vapor from the adsorption media while on the vehicle; and
condensing the desorbed fuel vapor and returning the condensed fuel to the fuel tank.

6. A fuel vapor removal method comprising:
removing fuel vapor from ullage of a fuel tank of a vehicle, the removing of the fuel vapor including purging the ullage with air added into the ullage;
reducing a fuel-air ratio in the ullage using the air purging, the reduced fuel-air ratio being below a flammability limit;
adsorbing the fuel vapor removed from the ullage onto adsorption media on the vehicle; and
desorbing the fuel vapor from the adsorption media while on the vehicle.

7. The method of claim 1 wherein the desorbing of the fuel vapor occurs while a fuel-air ratio in the ullage is below a flammability limit.

8. The method of claim 1 wherein the adsorption media comprises activated carbon and the desorbing of fuel vapor comprises reactivating the activated carbon.

9. The method of claim 1 wherein the adsorption media exhibits a first temperature at a conclusion of the adsorbing before the desorbing begins and the desorbing of the fuel vapor comprises flowing air through the media, the flowed air exhibiting a second temperature higher than the first temperature and the media being at a pressure below 14.7 pounds per square inch.

10. A fuel vapor removal method comprising:
purging fuel vapor from ullage of a fuel tank using air added into the ullage;
reducing a fuel-air ratio in the ullage using the air purging; and
adsorbing the purged fuel vapor onto adsorption media.

11. The method of claim 10 wherein the fuel tank and adsorption media are on an aircraft and the reduced fuel-air ratio is below a flammability limit.

12. The method of claim 10 further comprising desorbing the fuel vapor from the adsorption media while the fuel-air ratio is below a flammability limit.

13. The method of claim 12 wherein the adsorption media exhibits a first temperature at a conclusion of the adsorbing before the desorbing begins and the desorbing of the fuel vapor comprises flowing air through the media, the flowed air exhibiting a second temperature higher than the first temperature and the media being at a pressure below 14.7 pounds per square inch (psi).

14. The method of claim 13 wherein the fuel tank and adsorption media are on an aircraft, the desorbing of the fuel vapor occurs while the aircraft is in flight, and the flowed air contains ambient air and/or spent ram air.

15. A fuel vapor removal system comprising:
a fuel tank having ullage as a region inside the fuel tank;
an adsorption system including fuel vapor adsorption media fluidically connected to the ullage and to an ullage purging system; and
a controller including an ullage flammability determination system and configured to start fuel vapor removal by the purging system from the ullage onto the adsorption media as a result of the ullage approaching flammability.

16. The system of claim 15 further comprising a vehicle, wherein the fuel tank is a fuel tank of the vehicle and the adsorption system is on the vehicle.

17. The system of claim 16 wherein the vehicle comprises an aircraft.

18. The system of claim 15 wherein the adsorption system is an adsorption and desorption system and further comprises a fuel vapor desorption system, the controller being further configured to stop fuel vapor removal by the purging system and to start fuel vapor desorption by the desorption system while the ullage is nonflammable.

19. The system of claim 18 wherein the desorption system comprises an air blower and an air heater fluidically connected to the adsorption media.

20. The system of claim 15 wherein the purging system comprises an air inlet on the fuel tank and a suction pump fluidically connected to the adsorption media.

21. The system of claim 15 wherein the ullage flammability determination system comprises a fuel temperature sensor, a fuel tank pressure sensor, and a processor configured to determine flammability using at least a fuel temperature and a fuel tank pressure.

22. The system of claim 15 wherein the adsorption media comprises activated carbon.

\* \* \* \* \*